United States Patent
Komori

(10) Patent No.: US 10,883,645 B2
(45) Date of Patent: *Jan. 5, 2021

(54) MEMBER LINKING MECHANISM AND MEMBER LINKING METHOD

(71) Applicant: Shimadzu Corporation, Kyoto (JP)

(72) Inventor: Yuki Komori, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 110 days.

This patent is subject to a terminal disclaimer.

(21) Appl. No.: 16/075,748

(22) PCT Filed: Feb. 29, 2016

(86) PCT No.: PCT/JP2016/055979
§ 371 (c)(1),
(2) Date: Aug. 6, 2018

(87) PCT Pub. No.: WO2017/149583
PCT Pub. Date: Sep. 8, 2017

(65) Prior Publication Data
US 2019/0040990 A1  Feb. 7, 2019

(51) Int. Cl.
*F16L 55/00*  (2006.01)
*F16L 55/18*  (2006.01)
(Continued)

(52) U.S. Cl.
CPC .............. *F16L 55/18* (2013.01); *F16L 35/00* (2013.01); *F16L 37/002* (2013.01);
(Continued)

(58) Field of Classification Search
None
See application file for complete search history.

(56) References Cited

U.S. PATENT DOCUMENTS 5,567,309 A * 10/1996 Classon ............... B01D 33/015
                                                            210/233
6,360,794 B1 *  3/2002 Turner ..................... B65B 3/003
                                                            141/1
(Continued)

FOREIGN PATENT DOCUMENTS

CN          1755358 A    4/2006
CN        102869403 A    1/2013
(Continued)

OTHER PUBLICATIONS

Chinese Office Action dated Jul. 20, 2020, in connection with corresponding CN Application No. 201680082861.6 (22 pp., including machine-generated English translation).

*Primary Examiner* — Lisa M Caputo
*Assistant Examiner* — Nigel H Plumb
(74) *Attorney, Agent, or Firm* — Maier & Maier, PLLC

(57) ABSTRACT

A member linking mechanism, pairable with a gas chromatograph, which has a small and simple configuration, and is capable of linking two members together with a required fastening force even in a limited space. The member linking mechanism includes a first member having a member linking part with an opening at its distal-end surface; a second member to be linked to the member linking part of the first member; an elastic sealing member sandwiched between the first and second members so as to seal the opening of the distal-end surface of the member linking part; and a linking member for linking the first and second members together via pressure. The linking member includes: a linking member body configured to hold an end part, of the second member, adjacent to the first member; and an elastic deformation part provided to the linking member body.

8 Claims, 7 Drawing Sheets

(51) Int. Cl.
  *G01N 30/12*  (2006.01)
  *G01N 30/18*  (2006.01)
  *F16L 37/252* (2006.01)
  *F16L 35/00*  (2006.01)
  *F16L 37/00*  (2006.01)
  *F16L 37/14*  (2006.01)
  *F16L 55/115* (2006.01)
  *F16L 55/105* (2006.01)
  *G01N 30/02*  (2006.01)

(52) U.S. Cl.
  CPC ........... *F16L 37/142* (2013.01); *F16L 37/252* (2013.01); *G01N 30/12* (2013.01); *G01N 30/18* (2013.01); *F16L 55/105* (2013.01); *F16L 55/1155* (2013.01); *G01N 2030/025* (2013.01); *G01N 2030/126* (2013.01); *G01N 2030/185* (2013.01)

(56) References Cited

U.S. PATENT DOCUMENTS

| | | |
|---|---|---|
| 2006/0065122 A1 | 3/2006 | Song et al. |
| 2007/0090079 A1 | 4/2007 | Kelller |
| 2012/0318283 A1 | 12/2012 | Watanabe et al. |
| 2014/0318274 A1* | 10/2014 | Zimmerman .......... G01N 30/24 73/863 |
| 2019/0017975 A1* | 1/2019 | Komori .............. G01N 30/6026 |
| 2019/0040990 A1* | 2/2019 | Komori ................. F16L 37/252 |
| 2020/0010249 A1* | 1/2020 | Komori ................ B65D 81/325 |

FOREIGN PATENT DOCUMENTS

| | | |
|---|---|---|
| JP | 2005-263238 A | 9/2005 |
| JP | 2009-092672 A | 4/2009 |
| WO | 2015/004757 A1 | 1/2015 |

\* cited by examiner

US 10,883,645 B2

MEMBER LINKING MECHANISM AND MEMBER LINKING METHOD

TECHNICAL FIELD

The present invention relates to a member linking mechanism to be used to link two members together while retaining airtightness, and a member linking method for linking two members together while retaining airtightness. Such a member linking mechanism and a member linking method are used, for example, in the case of mounting a seal cap with an O-ring being sandwiched so as to seal an opening of a sample vaporizing unit of a gas chromatograph.

BACKGROUND ART

In general, a gas chromatograph is provided with a sample vaporizing unit for vaporizing a sample and sending it into an analytical column. An example of the sample vaporizing unit is briefly described here. The sample vaporizing unit has a housing including therein a space serving as a sample vaporizing chamber, and an upper portion of the housing is provided with a sample inlet for injecting a sample into the sample vaporizing chamber. A lower portion of the sample vaporizing chamber is connected to an analytical column, and carrier gas is introduced from the upper portion of the sample vaporizing chamber. The sample vaporizing chamber is heated to a high temperature, and the liquid sample injected into the sample vaporizing chamber is vaporized by heat to be sent into the analytical column by the carrier gas.

The sample vaporizing chamber provided in the housing contains a cylindrical insert made of quartz glass or the like, and the sample injected from the sample inlet is vaporized inside the insert. This configuration in which the sample is vaporized inside the insert allows sample gas to be introduced into the analytical column without contacting a metal interior wall of the sample vaporizing chamber.

Configured to be in direct contact with the sample, the insert is a component that is prone to be soiled by attachment of a residue and the like after the vaporization of the sample. For this reason, the insert is received within the sample vaporizing chamber in a detachable manner such that periodic replacement and washing of the insert can be performed (see Patent Document 1).

In general, the upper surface of the housing is provided with an opening leading to the sample vaporizing chamber, and the opening is sealed by mounting a seal cap with an O-ring being sandwiched. The sample inlet which a sample injecting needle pierces for injection of the sample is provided to the seal cap. The interior portion of the seal cap is provided with a septum for closing the sample inlet again after the sample injecting needle has been pulled out.

CITATION LIST

Patent Document

Patent Document 1: Japanese Unexamined Patent Publication No. 2009-92672
Patent Document 2: US 2007/0090079 A1

SUMMARY OF THE INVENTION

Technical Problem

A generally-used structure for mounting a seal cap to a housing is configured such that a screw thread on the housing and a screw thread on the seal cap are fitted in each other and the seal cap is turned to be fastened. However, with this structure, it is necessary to use a tool such as a wrench to turn the seal cap in order to mount/dismount the seal cap. However, this is not an easy operation because the presence of piping for introducing carrier gas and other components that are provided in the vicinity of the sample inlet make it difficult to turn the tool.

In a use where a certain member is mounted on another member while retaining airtightness such as a case in which a seal cap is mounted on the body of a sample vaporizing unit, those members need to be fastened with a strength above a certain level so as to deform an O-ring that is sandwiched between those members to some extent. However, in a method where a seal cap is turned so as to be screwed as described above, it is hard to perceive how much the seal cap needs to be turned to deform the O-ring as required. Therefore, the airtightness of the sample vaporizing chamber may not be sufficiently retained due to insufficient fastening of the seal cap, or the O-ring may be deformed more than is needed, so that it no longer can be elastically deformed to be broken.

A bayonet linking tool is one of the mechanisms for easily linking members (for example, see Patent Document 2). In a bayonet linking tool as disclosed in Patent Document 2, two members can be fixed in a linked state. However, although a fastening force of at least about 30 N is needed to deform, as required, an O-ring to be used to maintain airtightness within a sample vaporizing chamber in a gas chromatograph, the conventional bayonet linking tool is not designed for such a use. Thus, even by using the conventional bayonet linking tool, a fastening force that is needed to deform the O-ring as required cannot be obtained.

It is therefore an object of the present invention to provide a member linking mechanism which has a small and simple configuration, and is capable of linking two members together with a required fastening force even in a limited space.

Solution to the Problem

A member linking mechanism according to the present invention includes: a first member including a member linking part which is in a cylindrical shape and has an opening on a distal-end surface thereof, and a stepped part on an outer peripheral surface or inner peripheral surface of the member linking part, the stepped part being inclined from a distal end to a base end of the member linking part in a circumferential direction; a second member to be linked to the member linking part; an elastic sealing member sandwiched between the first member and the second member so as to seal the opening of the distal-end surface of the member linking part; and a linking member having a linking member body configured to hold an end part, of the second member, adjacent to the first member, and an elastic deformation part provided to the linking member body, the linking member being configured to link the first and second members together by pressing, with an elastic force of the elastic deformation part, the first and second members in a direction in which the first and second members come close to each other. The elastic deformation part of the linking member has a protrusion part that protrudes toward the outer or inner peripheral surface of the member linking part so as to engage with the stepped part of the member linking part. Due to a rotation of the linking member in a circumferential direction of the member linking part, the elastic deformation part is elastically deformed such that the protrusion part is slid along the stepped part, and generates an elastic force that deforms the elastic sealing member as required when the protrusion part reaches a position at a predetermined distance from the base end of the member linking part. One of the protrusion part or a sliding surface of the stepped part is made of a high-hardness material having a high hardness, while the other is made of a resin having a lower hardness than the high-hardness material and high sliding properties with respect to the high-hardness material.

Here, the high-hardness material refers to a material such as metals having a higher hardness than resins such as super engineering plastics that will be described below.

The protrusion part may be made of a super engineering plastic. The super engineering plastic as used herein is a material having excellent sliding properties and excellent wear resistance. Examples of the super engineering plastic include fluororesin such as polytetrafluoroethylene (PTFE), polyetheretherketone (PEEK) resin, polybenzimidazole (PBI) resin, polyimide (PI) resin, and polyphenylene sulfide (PPS) resin. By using such a super engineering plastic as the material for the protrusion part, the sliding properties and wear resistance of the protrusion part improve, and wear debris will not be generated even if the protrusion part is slid on the side surfaces of the stepped part about 2000 times with a force of about 30 N. Furthermore, since super engineering plastics have low friction resistance, operability for turning the linking member also improves compared to a case in which the protrusion part is made of a metal. Furthermore, since such super engineering plastics are also excellent in heat resistance, these can be applied to, for example, a mounting/dismounting mechanism of a cap in a sample vaporizing unit of a gas chromatograph.

In addition, the surface of the protrusion part or the sliding surface of the stepped part may be coated with a resin coating for reducing a coefficient of friction. Examples of such a coating include PTFE (polytetrafluoroethylene) coating and PEEK (polyetheretherketone) coating.

The protrusion part is preferably configured as a pin press-fitted that is in a hole formed in the elastic deformation part. This simple configuration allows the pin to be replaced when the pin becomes worn.

In a preferred embodiment of the member linking mechanism according to the present invention, the linking member body is configured as a ring-shaped member surrounding the end part, of the second member, adjacent to the first member, the elastic deformation part is configured as an arc-shaped cantilever spring that is elastically deformed in a direction perpendicular to an end face of the first member, the elastic deformation part having a base end coupled to the linking member body, and a distal end provided closer to the first member than the linking member body, and extending parallel to the linking member body in a circumferential direction of the linking member body, with a gap between the distal end and the linking member body; and the protrusion part protrudes from a distal-end part of the elastic deformation part toward the outer peripheral surface of the member linking part.

The elastic deformation part is preferably comprised of a square spring. The square spring refers to a leaf spring having a quadrangular cross-sectional shape. Such a square spring has a larger spring constant than other springs, and it can provide a large elastic force with small deformation. In this manner, the linking member can be further reduced in size.

Regarding the size of the linking member, in a state where the elastic deformation part is not elastically deformed, the linking member preferably has a length of 20 mm or shorter, the length being from an end adjacent to the second member to another end adjacent to the first member and being perpendicular to the distal-end surface of the member linking part. Having this size, the linking member can be disposed in a portion with a limited space, such as in a sample vaporizing chamber of a gas chromatograph.

The spring constant of the elastic deformation part is preferably 30 N/mm or greater and 100 N/mm or smaller. By setting the spring constant to 30 N/mm or greater, even when the elastic deformation part is made to have a small size and the maximum deformation of the elastic deformation part is set to be 2 mm or smaller, a fastening force that is needed to deform the elastic sealing member sandwiched between the first and the second members as required can be obtained, and it is possible to substantially prevent breakage of the elastic sealing member which may be caused by excessive deformation.

A member linking method according to the present invention is a method of linking a first member to a second member separate from the first member, the first member including a member linking part which is in a cylindrical shape and has an opening on a distal-end surface thereof, and a stepped part on an outer peripheral surface or inner peripheral surface of the member linking part, the stepped part being inclined from a distal end to a base end of the member linking part in a circumferential direction. This member linking method uses a linking member having a linking member body configured to hold an end part, of the second member, adjacent to the first member, and an elastic deformation part provided to the linking member body, the elastic deformation part being provided with a protrusion part that protrudes toward the outer or inner peripheral surface of the member linking part so as to engage with the stepped part on the member linking part and slide along the stepped part in association with a rotation of the linking member. One of the protrusion part or a sliding surface of the stepped part is made of a high-hardness material having a high hardness, while the other is made of a resin having a lower hardness than the high-hardness material and high sliding properties with respect to the high-hardness material.

According to this method, the first and the second members are linked together by the following steps:

sandwiching the elastic sealing member between the first member and the second member so as to seal the opening of the distal-end surface of the member linking part;

holding the second member with the linking member body; engaging the protrusion part with the stepped part of the first member; and deforming the elastic deformation part by rotating the linking member in a direction so as to slide the protrusion part to a position at a predetermined distance from a base end of the member linking part along the stepped part, and causing the elastic deformation part to generate an elastic force that deforms the elastic sealing member as required.

Advantages of the Invention

In the member linking mechanism according to the present invention, the protrusion part is provided to the elastic deformation part of the linking member, and the protrusion part is configured to engage with the stepped part provided on the outer peripheral surface or inner peripheral surface of the member linking part of the first member, while the linking member body of the linking member is configured to engage with the end part, of the second member, adjacent to the first member. Thus, the gap between the protrusion part and the linking member body in the linking member is very short, and the linking member can be made to have a small size. In this manner, the linking member can be disposed in a portion with a limited space, such as in a sample vaporizing chamber of a gas chromatograph. Furthermore, an elastic force that deforms the elastic sealing member as required is generated in the elastic deformation part, when the linking member is rotated to slide the protrusion part along the stepped part, and the protrusion part reaches a position at a predetermined distance from the base end of the member linking part. Thanks to this configuration, an operator simply needs to rotate the linking member to link the first and the second members together, while certainly sealing the opening of the first member using the elastic force of the elastic deformation part. Thus, this configuration makes it easy to link the first and the second members together, while sealing the opening of the first member.

In order to seal the opening by deforming an O-ring, which is a representative example of the elastic sealing member, the first member and the second member need to be pushed with a force of 30 N or greater, and such a degree of elastic force is generated in the elastic deformation part. Accordingly, when the linking member is rotated, the protrusion part of the elastic deformation part slides on the side surface of the stepped part while being pressed against the inclined plane of the stepped part with a strong force. If the stepped part and the protrusion part were both made of a metal, wear debris would be generated by sliding repeated about 100 to 200 times, and unevenness would be generated due to wear of the side surface of the stepped part. In that case, the operational feeling in turning the linking member may be worsened, or replacement of the linking member may be needed due to wear of the protrusion part.

In contrast, in the present invention, one of the protrusion part or the sliding surface of the stepped part is made of a high-hardness material having a high hardness, while the other is made of a resin having a lower hardness than the high-hardness material and high sliding properties with respect to the high-hardness material. In the case where one of the members sliding over each other is made of a high-hardness material, while the other member is made of a material having a lower hardness than the high-hardness material, the other member, which has the lower hardness, will become worn. However, by using a resin having high sliding properties with respect to the high-hardness material to form the other member that has the lower hardness, wear of both of the members can be substantially prevented.

Note that, as previously mentioned, a structure in which a protrusion part is engaged with a groove or a step, and then slid can also be conceived in a bayonet linking tool for linking and fixing two members together. Since such a bayonet linking tool is not designed to achieve fastening with a strong force that causes deformation of an O-ring as required, wear due to sliding is less likely to be generated. Accordingly, there is no need to consider wear of a sliding surface in the conventional linking tool such as the bayonet linking tool.

As in the case of the above-described member linking mechanism, the member linking method according to the present invention allows an operator to link the first and second members together while certainly sealing the opening of the first member by using the elastic force of the elastic deformation part, simply by rotating the linking member. Thus, the member linking method of the present invention makes it easy to link the first and the second members together, while sealing the opening of the first member. Furthermore, since one of the protrusion part or the sliding surface of the stepped part is made of a high-hardness material having a high hardness, while the other is made of a resin having a lower hardness than the high-hardness material and high sliding properties with respect to the high-hardness material, wear of both the protrusion part and the stepped part can be reduced.

DESCRIPTION OF EMBODIMENTS

An embodiment of a sample vaporizing unit in a gas chromatograph to which the member linking mechanism 100 according to the present invention is applied will be described with reference to the drawings.

Figure 1:
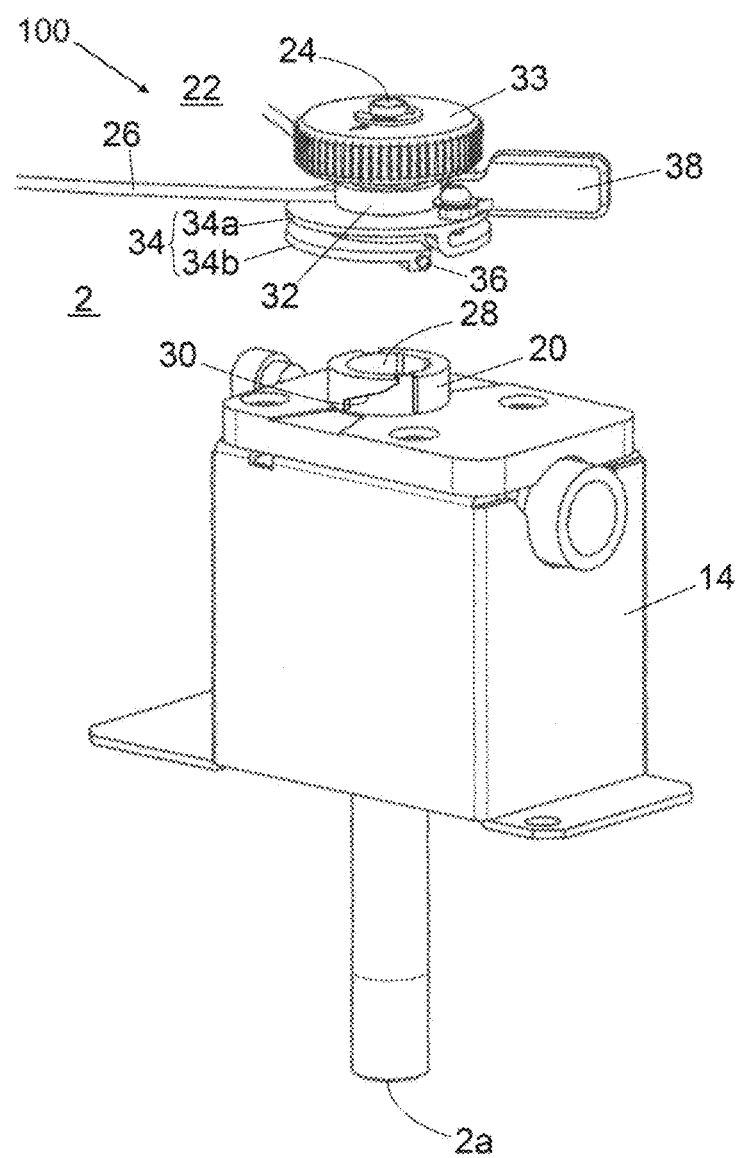
FIG. 1 is a perspective view of an embodiment of a sample vaporizing unit to which a member linking mechanism according to the present invention is applied, illustrating a state in which a seal cap has not yet been mounted.
Figure 2:
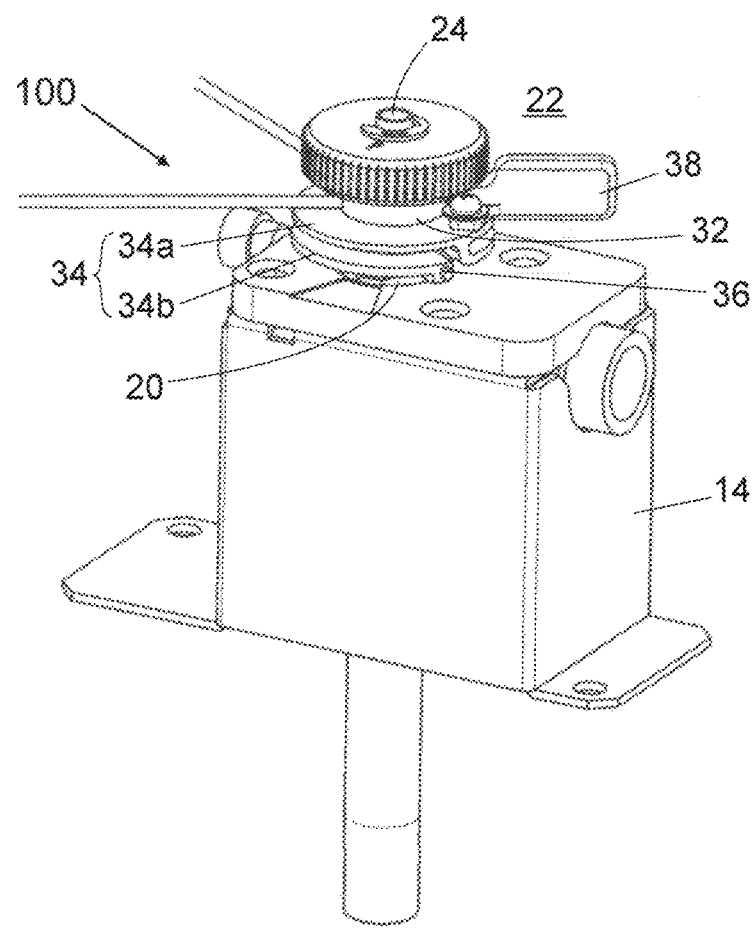
FIG. 2 is a perspective view of the embodiment, with the seal cap attached.
Figure 3:
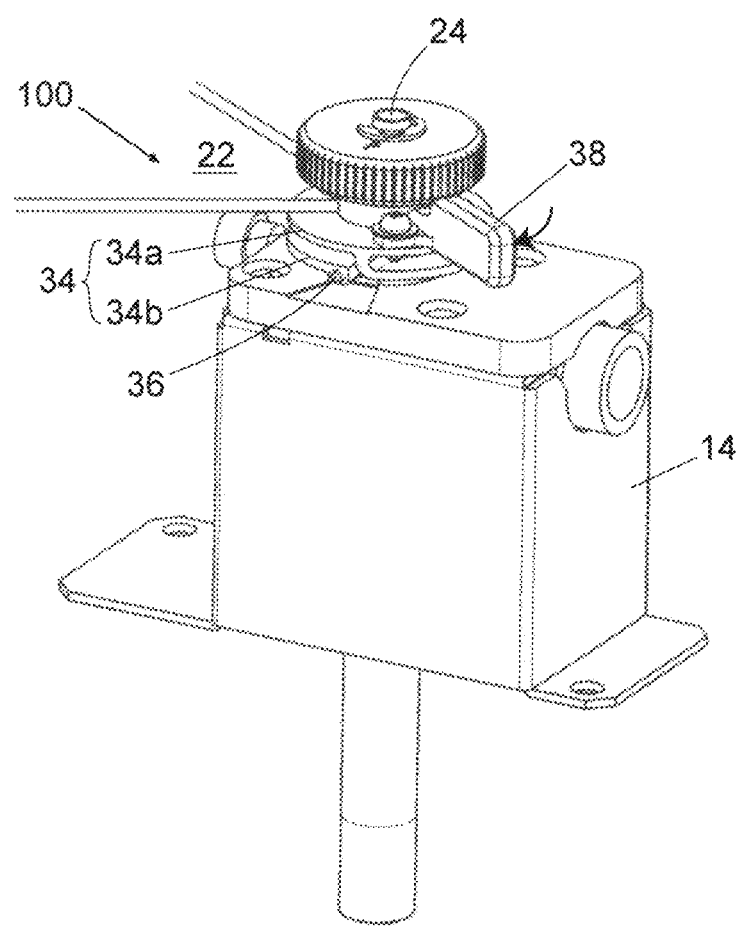
FIG. 3 is a perspective view of the embodiment, with the seal cap fixed.

As illustrated in FIGS. 1 to 3, a housing 14 (first member) of a sample vaporizing unit 2 has a rectangular-column shape in this embodiment. Note that, the shape of the housing 14 is not limited to the rectangular-column shape, and it may be in other shapes such as a columnar shape. The housing 14 includes therein a space 14a (see FIG. 4; hereinafter, referred to as the interior space 14a) for containing an insert 16. The interior space 14a is comprised of a columnar-shaped bore that extends from the upper surface of the housing 14 and ends at outlet 2a located at the bottom. The housing 14 is made of a metal material having good thermal conductivity. The housing 14 has a heater (not illustrated) that is buried so as to surround the interior space 14a. The insert 16 contained in the interior space 14a is heated by the heater. The insert 16 is a cylindrical member made of quartz glass or the like.

The housing 14 has an opening 28 sealed with a seal cap 22 (second member). The seal cap 22 includes a seal cap body 32 having a cylindrical shape, and a septum cover 33 having a disk shape and attached to an uppermost part of the seal cap body 32. The septum cover 33 is provided with a needle insertion part 24.

Figure 4A:
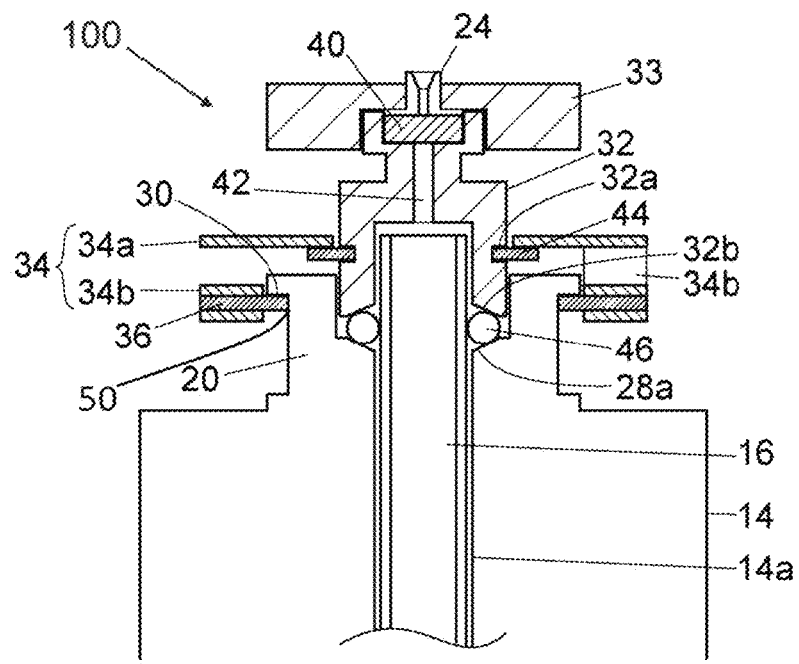
FIG. 4A is a cross-sectional view of the embodiment, illustrating a state before the seal cap is fastened.

As illustrated in FIG. 4A, a septum 40 is arranged in an uppermost part of the seal cap body 32, and the septum cover 33 is mounted on the uppermost part of the seal cap body 32 such that the needle insertion part 24 is positioned above the septum 40. The septum 40 is pierceable with a sample injecting needle that is inserted from the needle insertion part 24, and configured to close a through-hole created by the needle with its elasticity, after the needle has been pulled out. The septum 40 is made of an elastic material such as natural rubber, silicone rubber, or the like. The needle pierces the septum 40, and a sample is discharged from the tip of the needle toward the insert 16, via a through-hole 42 at the center of the seal cap body 32.

The edge of the opening 28 on the upper surface of the housing 14 upwardly protrudes in an annular shape so as to form a cap mounting part 20 (member linking part). The seal cap 22 is fixed on the cap mounting part 20 by a linking member 34. A stepped part 30 is provided in each of two symmetrical portions of the outer peripheral surface of the cap mounting part 20. (In the alternative embodiment shown in FIG. 4C, the stepped part 30 may instead be provided in each of two symmetrical portions on the inner peripheral surface of the cap mounting part 20.) In the embodiment of FIG. 4A, the stepped part 30 is inclined in the circumferential direction of the cap mounting part 20 from the distal end to the base end of the cap mounting part 20. The stepped part 30 has a side surface that faces the base end of the cap mounting part 20. To mount the seal cap 22 on the housing 14, a pin 36 of the linking member 34 attached to the seal cap 22 is engaged with the side surface of the stepped part 30. By rotating the linking member 34 in a plane (plane of rotation) which is perpendicular to the axial direction of the cap mounting part 20, the pin 36 is slid along the side surface of the stepped part 30, and is displaced in the axial direction of the cap mounting part 20.

Figure 5A:
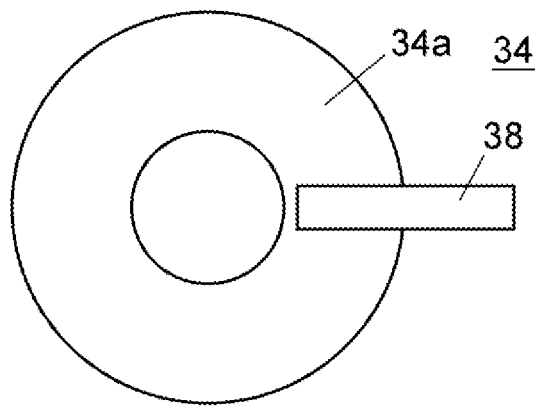
FIG. 5A is a plan view of a linking member of the member linking mechanism according to the embodiment.
Figure 5B:
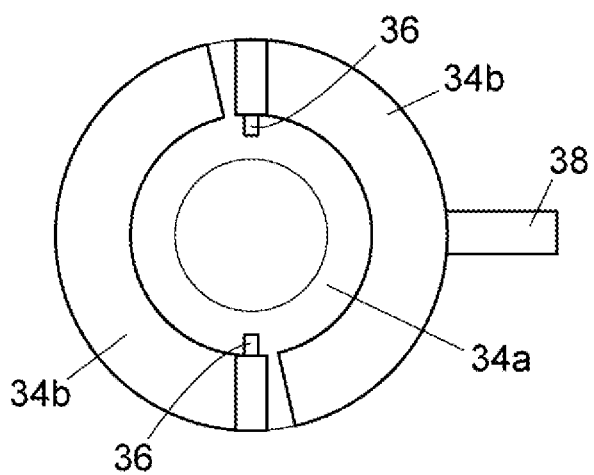
FIG. 5B is a bottom view of the linking member according to the embodiment.
Figure 5C:
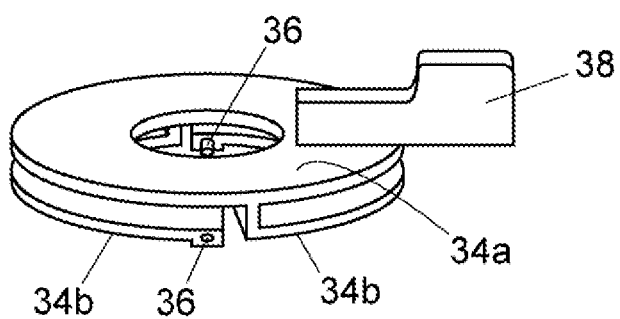
FIG. 5C is a perspective view of the linking member according to the embodiment.

As illustrated in FIGS. 5A to 5C, the linking member 34 includes a linking member body 34a having a ring shape with a bore provided at the center, and two elastic deformation parts 34b that are provided on one of the surface of the linking member body 34a. When the side of the linking member 34 on which the elastic deformation part 34b is absent is regarded as the front surface, and the side on which the elastic deformation parts 34b are provided is regarded as the back surface, the linking member 34 is mounted on the seal cap body 32 such that its back surface faces the housing 14.

Each elastic deformation part 34b of the linking member 34 extends in an arc shape along the peripheral edge of the linking member body 34a with a constant gap provided between the elastic deformation part 34b and the linking member body 34a. The base end of the elastic deformation part 34b is integral with the linking member body 34a, while the distal end is a free end. In other words, the elastic deformation part 34b forms a cantilever spring. The distal end of the elastic deformation part 34b is provided with the pin 36, which forms a protrusion part that protrudes inward. In this embodiment, the pin 36 is fixed to the elastic deformation parts 34b by being press-fitted into a through-hole provided at the distal end of the elastic deformation part 34b. The two elastic deformation parts 34b have the same shape, and each of the pins 36 at the distal end thereof are arranged in positions opposing each other. The linking member body 34a is provided with a lever 38 (action part) for allowing the linking member 34 to be held and rotated.

In this embodiment, the linking member body 34a and the elastic deformation parts 34b of the linking member 34 are integrally formed by a manufacturing method such as machining out from a metal block or metal injection molding (MIM). Note that the linking member body 34a and the elastic deformation parts 34b may be formed as separate components, and then coupled together. In that case, the linking member body 34a and the elastic deformation parts 34b do not have to be made of the same raw material.

The linking member body 34a is engaged with the seal cap body 32 such that the linking member body 34a is movable in the circumferential direction of the outer peripheral surface of the seal cap body 32. In other words, the linking member body 34a constitutes a second engagement part that engages with the end part of the seal cap body 32, which is the second member, the end part being adjacent to the housing 14.

Specifically, as illustrated in FIG. 4A, the outer peripheral surface of the seal cap body 32 is provided with a horizontal groove 32a, which is an annular recess extending in the circumferential direction. A C-shaped snap ring 44 is fitted into the horizontal groove 32a. The C-shaped snap ring 44 is a metal member having the shape of letter C having a portion cut away. The C-shaped snap ring 44 has an inside diameter which is generally as large as an outside diameter of the seal cap body 32 in the portion where the horizontal groove 32a is provided. The C-shaped snap ring 44 has an outside diameter larger than an outside diameter of the seal cap body 32 in the portion where the horizontal groove 32a is absent. The inside diameter of the bore at the center of the linking member body 34a of the linking member 34 is larger than the outside diameter of the seal cap body 32 in the portion where the horizontal groove 32a is absent, while inside diameter of the bore is smaller than the outside diameter of the C-shaped snap ring 44. The seal cap body 32 is fitted into the bore at the center of the linking member body 34a such that the C-shaped snap ring 44 is positioned below the linking member body 34a. Note that instead of the horizontal groove 32a and the C-shaped snap ring 44, a flange part that protrudes from the outer peripheral surface of the seal cap body 32 and extends in the circumferential direction may be integrally provided with the seal cap 32.

Figure 4B:
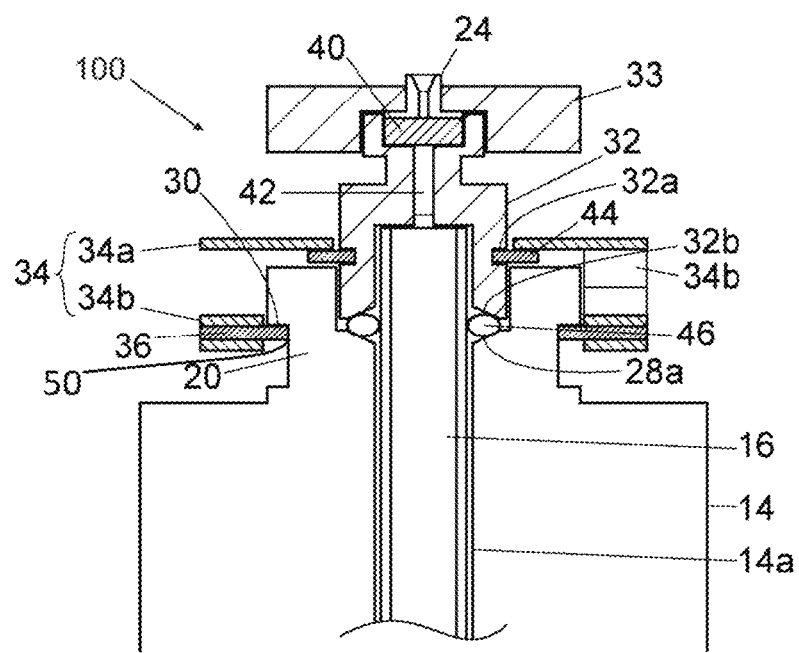
FIG. 4B is a cross-sectional view of the embodiment, illustrating a state in which the seal cap has been fastened.
Figure 4C:
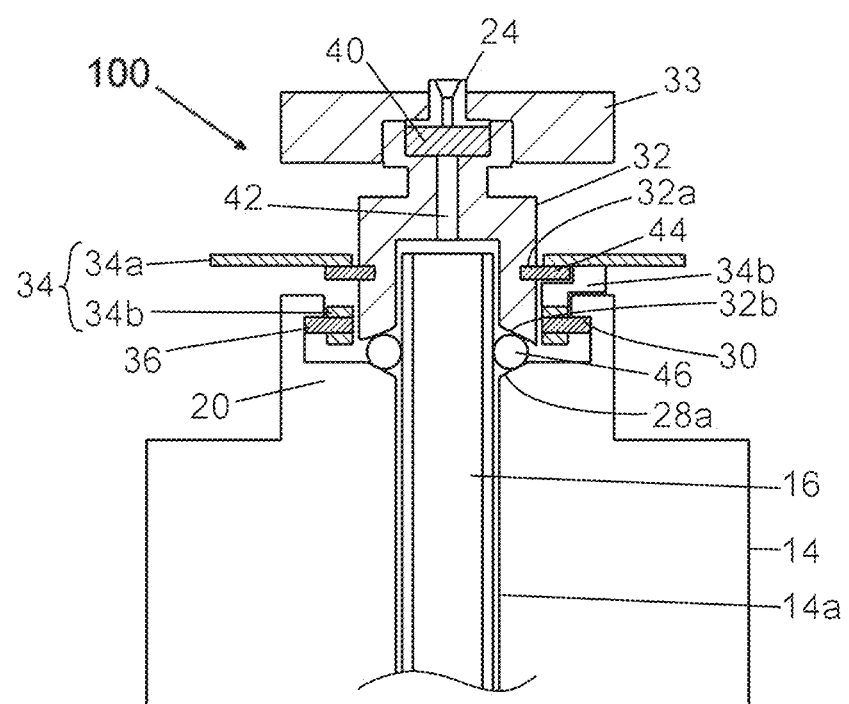
FIG. 4C is a cross-sectional view of an alternative embodiment, illustrating a state before the seal cap is fastened.
Figure 6:
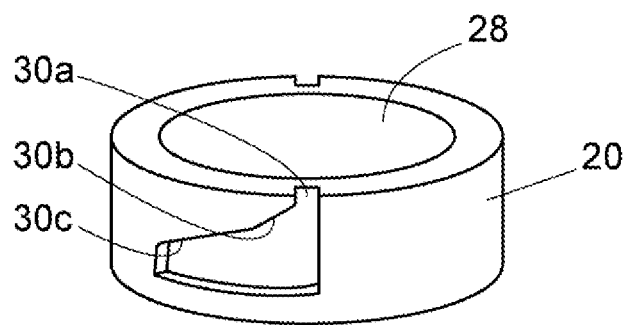
FIG. 6 is a perspective view of a cap mounting part according to the embodiment.

As illustrated in FIG. 6, the stepped part 30 includes a recess 30a, which is provided on the outer side of the upper end surface of the cap mounting part 20 (or the inner side of the upper end surface of the cap mounting part 20, in the alternative embodiment shown in FIG. 4C where the pin 36 may be provided inside rather than outside of the cap mounting part 20) and configured to receive the pin 36. The stepped part 30 also includes side surfaces 30b and 30c, which are continuous with each other and face the base end of the cap mounting part 20. The seal cap 22 is fixed to the cap mounting part 20 in the following manner. The seal cap 22 is placed on the cap mounting part 20 such that each of the pins 36 at the distal ends of the elastic deformation parts 34b of the linking member 34 is fitted into an associated one of the recesses 30a (the state shown in FIG. 2), and then, the linking member 34 is rotated in one direction (the clockwise direction in FIG. 6) such that each pin 36 is slid along the side surfaces 30b and 30c of the associated stepped part 30 (the state shown in FIG. 3).

The side surfaces 30 b and 30 c of the stepped part 30 are inclined with respect to the plane of rotation of the linking member 34 such that the pin 36 that has been fitted into the recess 30 a is displaced toward the base end of the cap mounting part 20 as the pin 36 moves in the clockwise direction along the outer peripheral surface (or, in the embodiment provided in FIG. 4C, along the inner peripheral surface) of the cap mounting part 20. The side surfaces 30 b and 30 c are inclined at different inclination angles. The inclination angle of the side surface 30 c is gentler than the inclination angle of the side surface 30 b.

As illustrated in FIG. 4A, an O-ring 46 (elastic sealing member) for sealing a gap between the outer peripheral surface of the insert 16 and the inner wall surface of the interior space 14a is arranged near the opening of the interior space 14a in the housing 14. The O-ring 46 is made of, for example, fluoro-rubber or the like. An annular pedestal 28a that is inclined such that its inside diameter decreases downward is provided on the inner side wall of the housing 14 near the opening 28, and the O-ring 46 is supported on the pedestal 28a. The seal cap body 32 has, in its lower surface, a recess for receiving the upper end of the insert 16, and a lower end part thereof is received within the opening 28 such that the lower end part and the pedestal 28 sandwich the O-ring 46. Contrary to the pedestal 28a, the annular lower end surface of the seal cap body 32 is inclined such that its inside diameter increases downward.

When the seal cap 22 is placed over the cap mounting part 20 such that each pin 36 of the linking member 34 is positioned at the recess 30a of the associated stepped part 30, the lower end of the seal cap body 32 comes into contact with the O-ring 46. In this state, rotating the linking member 34 so as to slide the pin 36 along the side surfaces 30b and 30c of the stepped part 30 causes the pin 36 to be displaced toward the base end of the cap mounting part 20, as illustrated in FIG. 4B, resulting in that the linking member body 34a presses the C-shaped snap ring 44 downward. Consequently, the seal cap body 32 is pressed downward. Due to the engagement of the linking member body 34a with the C-shaped snap ring 44, the linking member 34 presses the seal cap body 32 downward, while rotating independently of the seal cap body 32. Thus, only the linking member 34 can be rotated without rotating the seal cap 22.

The elastic deformation parts 34b of the linking member 34 are elastically deformed so as to displace the position of the pins 36 in the axial direction of the cap mounting part 20 relative to the linking member body 34a, and have such spring properties that generate a restoring force according to the displacement. When each pin 36 reaches the endpoint position on the side surface 30c of the associated stepped part 30 due to the rotation of the linking member 34, the elastic force of the elastic deformation parts 34b presses the seal cap body 32 in a direction in which the seal cap body 32 is pushed into the opening 28, thereby deforming the O-ring 46 to a degree capable of substantially completely preventing entry of gas into the gap between the inner side wall of the interior space 14a and the outer peripheral surface of the insert 16. The elastic deformation parts 34b of the linking member 34 are designed to generate an elastic force needed to deform the O-ring 46 as required when each pin 36 reaches the endpoint position on the associated side surface 30c, the endpoint position being set as a position at a predetermined distance from the base end of the cap mounting part 20.

For example, the linking member 34 is designed such that the linking member body 34a has a thickness of about 1 mm and an outside diameter of about 30 mm, and the elastic deformation part 34b has a thickness of about 1.5 mm and an outside diameter of about 30 mm, wherein the gap between the linking member body 34a and the elastic deformation part 34b is about 2 mm.

Materials having a tensile strength of about 1000 MPa are suitable as the material for the linking member 34, and the examples of the materials include stainless steel provided with precipitation hardening treatment or solution treatment (e.g., SUS630) and stainless steel as a spring material (e.g., SUS301CSP and SUS304CSP), alloy steel (e.g., SCM420, SCM445, and SNCM630), a titanium alloy (e.g., Ti-6Al-4V (64 titanium)), and a copper alloy (e.g., beryllium copper and phosphor bronze).

The elastic deformation part 34b has a quadrangular cross-sectional shape, and a spring constant of 30 N/mm or greater. The elastic deformation part 34b generates an elastic force of about little less than 100 N even when the maximum displacement is 2 mm or smaller. As a result, despite the fact that the overall thickness of the linking member 34 is 20 mm or less, a fastening force that is needed to deform the O-ring 46 as required can be obtained.

Since the sample vaporizing unit 2 vaporizes the sample inside the sample vaporizing unit 2, the housing 14 reaches a high temperature of 200° C. or higher. For this reason, the housing 14 is made of a metal having excellent heat resistance, and the cap mounting part 20, which is integrally provided with the housing 14, is similarly made of a metal. Since the pins 36 of the linking member 34 come in contact with the stepped parts 30 of the cap mounting part 20, the pins 36 need to have heat resistance. If the linking member 34 were designed for simply linking and fixing two members together, as in the case of the generally used bayonet linking tool, for example, it would be suitable to form the pins 36 using a metal having excellent heat resistance.

However, as described earlier, the linking member 34 of this embodiment deforms the O-ring 46 by utilizing the elastic force that is as large as 30 N or greater, and that is generated by the elastic deformation parts 34b. Thus, when the linking member 34 is turned to fasten the seal cap 22, the pins 36 and the side surfaces of the stepped parts 30 will be strongly pressed against each other with the elastic force of the elastic deformation parts 34b. Accordingly, if each pin 36 were made of a metal, metal-to-metal friction would be caused by a strong force during sliding of the pin 36 along the side surfaces of the stepped part 30, which are metallic surfaces. Such friction would cause problems such as formation of unevenness on the side surfaces of the stepped parts 30 due to wear, and wear of the pins 36.

The pins 36 provided to the linking member 34 of this embodiment are made of a super engineering plastic, and examples thereof include fluororesin such as polytetrafluoroethylene (PTFE), polyetheretherketone (PEEK) resin, polybenzimidazole (PBI) resin, polyimide (PI) resin, and polyphenylene sulfide (PPS) resin. Such a super engineering plastic is excellent in heat resistance, sliding properties, and wear resistance. Furthermore, it can endure the use for the sample vaporizing unit 2, which is heated to a high temperature of 200° C. or higher, while it can reduce the friction resistance when the pin 36 is slid along the side surfaces of the stepped part 30, and reduce the wear of the pin 36 and the stepped part 30. In addition, the pin 36 made of a super engineering plastic having excellent sliding properties improves the operability in turning the linking member 34 compared to the case in which the pin 36 is made of a metal.

Note that, in the above-described embodiment, the pin 36 made of a super engineering plastic and press-fitted into the hole of the elastic deformation part 34b is exemplified as the protrusion part to be engaged with the stepped part 30. However, any protrusion can be adopted instead of the above-described pin 36, as long as the protrusion can be engaged with the stepped part 30, has a resin surface having a lower hardness than a metal that is a high-hardness material, and having high sliding properties with respect to the metal.

An example of a protrusion part replacing the pin 36 is a metallic protrusion covered with a cap made of a resin such as a super engineering plastic having excellent sliding properties and wear resistance. The metallic protrusion may be integrally provided with the elastic deformation part 34b, or it may be attached to the elastic deformation part 34b afterward.

Another example of the protrusion part replacing the pin 36 is a metallic protrusion coated with a resin coating for decreasing the coefficient of friction with a metal. The metallic protrusion may be integrally provided with the elastic deformation part 34b, or it may be attached to the elastic deformation part 34b afterward, also in this case. Examples of the resin coating for reducing the coefficient of friction with a metal include PTFE coating and PEEK.

In addition, the wear of the sliding surfaces 50 of the stepped part 30 and the pin 36 can be reduced also if the pin 36 is made of a metal, and the side surfaces of the stepped part 30 is coated with a resin coating having a lower hardness than the metal and high sliding properties with respect to the metal, such as PTFE coating and PEEK coating.

In the embodiment described above, the linking member 34, which includes two disk members (the linking member body 34a and the two elastic deformation parts 34b), has a large surface area contacting outside air, and therefore, functions as a radiating fin. This contributes to quick cooling of the seal cap 22.

DESCRIPTION OF REFERENCE CHARACTERS

2 Sample Vaporizing Unit
2a Outlet of Sample Vaporizing Unit
14 Housing (First Member)
14a Interior Space of Housing
16 Insert
20 Cap Mounting Part (Member Linking Part)
22 Seal Cap (Second Member)
24 Needle Insertion Part
26 Piping for Supplying Carrier Gas
28 Opening
30 Stepped Part
30a Recess
30b, 30c Side Surface of Stepped Part
32 Seal Cap Body
32a Horizontal Groove
33 Septum Cover
34 Linking Member
34a Linking Member Body
34b Elastic Deformation Part
36 Pin (Protrusion Part)
38 Lever (Action Part)
40 Septum
42 Through-Hole
44 C-Shaped Snap Ring
46 O-Ring
100 Member Linking Mechanism

The invention claimed is:

1. A member linking mechanism comprising:
a first member including a member linking part which is in a cylindrical shape and has an opening on a distal-end surface thereof, and a stepped part on an outer peripheral surface or inner peripheral surface of the member linking part, the stepped part being inclined from a distal end to a base end of the member linking part in a circumferential direction;
a second member to be linked to the member linking part;
an elastic sealing member sandwiched between the first member and the second member so as to seal the opening of the distal-end surface of the member linking part; and
a linking member having a linking member body having a lever configured to hold an end part, of the second member, adjacent to the first member, and an elastic deformation part provided to the linking member body, the linking member being configured to link the first and second members together by pressing, with an elastic force of the elastic deformation part, the first and second members in a direction in which the first and second members come close to each other, wherein
the elastic deformation part of the linking member has a protrusion part that protrudes toward the outer or inner peripheral surface of the member linking part so as to engage with the stepped part of the member linking part,
due to a rotation of the linking member in a circumferential direction of the member linking part, the elastic deformation part is elastically deformed such that the protrusion part is slid along the stepped part, and generates an elastic force that deforms the elastic sealing member as required when the protrusion part reaches a position at a predetermined distance from the base end of the member linking part, and
one of the protrusion part or a sliding surface of the stepped part is made of a high-hardness material having a high hardness, while the other is made of a resin having a lower hardness than the high-hardness material and high sliding properties with respect to the high-hardness material.

2. The member linking mechanism of claim 1, wherein the protrusion part is made of a super engineering plastic.

3. The member linking mechanism of claim 1, wherein the protrusion part or the sliding surface of the stepped part is coated with a resin coating for reducing a coefficient of friction with respect to the high-hardness material.

4. The member linking mechanism of claim 1, wherein the protrusion part is configured as a pin that is press-fitted in a hole formed in the elastic deformation part.

5. The member linking mechanism of claim 1, wherein the linking member body is configured as a ring-shaped member surrounding the end part, of the second member, adjacent to the first member,
the elastic deformation part is configured as an arc-shaped cantilever spring that is elastically deformed in a direction perpendicular to an end face of the first member, the elastic deformation part having a base end coupled to the linking member body, and a distal end provided closer to the first member than the linking member body, and extending parallel to the linking member body in a circumferential direction of the linking member body, with a gap between the distal end and the linking member body, and
the protrusion part protrudes from a distal-end part of the elastic deformation part toward the outer peripheral surface of the member linking part.

6. The member linking mechanism of claim 1, wherein in a state where the elastic deformation part is not elastically deformed, the linking member has a length of 20 mm or shorter, the length being from an end adjacent to the second member to another end adjacent to the first member and being perpendicular to the distal-end surface of the member linking part.

7. The member linking mechanism of claim 1, wherein the elastic deformation part has a spring constant of 30 N/mm or more and 100 N/mm or less.

8. A member linking method of linking a first member to a second member separate from the first member, the first member including a member linking part which is in a cylindrical shape and has an opening on a distal-end surface thereof, and a stepped part on an outer peripheral surface or inner peripheral surface of the member linking part, the stepped part being inclined from a distal end to a base end of the member linking part in a circumferential direction, the member linking method using a linking member having a linking member body having a lever and configured to hold an end part, of the second member, adjacent to the first member, and an elastic deformation part provided to the linking member body, the elastic deformation part being provided with a protrusion part that protrudes toward the outer or inner peripheral surface of the member linking part so as to engage with the stepped part on the member linking part and slide with respect to the stepped part based on a rotation of the linking member, and one of the protrusion part or a sliding surface of the stepped part being made of a high-hardness material having a high hardness, while the other being made of a resin having a lower hardness than the high-hardness material and high sliding properties with respect to the high-hardness material, the member linking method comprising:

sandwiching an elastic sealing member between the first member and the second member so as to seal the opening of the distal-end surface of the member linking part;

holding the second member with the linking member body;

engaging the protrusion part with the stepped part of the first member; and deforming the elastic deformation part by rotating the linking member in a direction so as to slide the protrusion part to a position at a predetermined distance from the base end of the member linking part along the stepped part, and causing the elastic deformation part to generate an elastic force that deforms the elastic sealing member as required.

* * * * *